April 28, 1942.  H. G. NELSON  2,280,967
ROTARY ENGINE
Filed Oct. 21, 1940  5 Sheets-Sheet 1
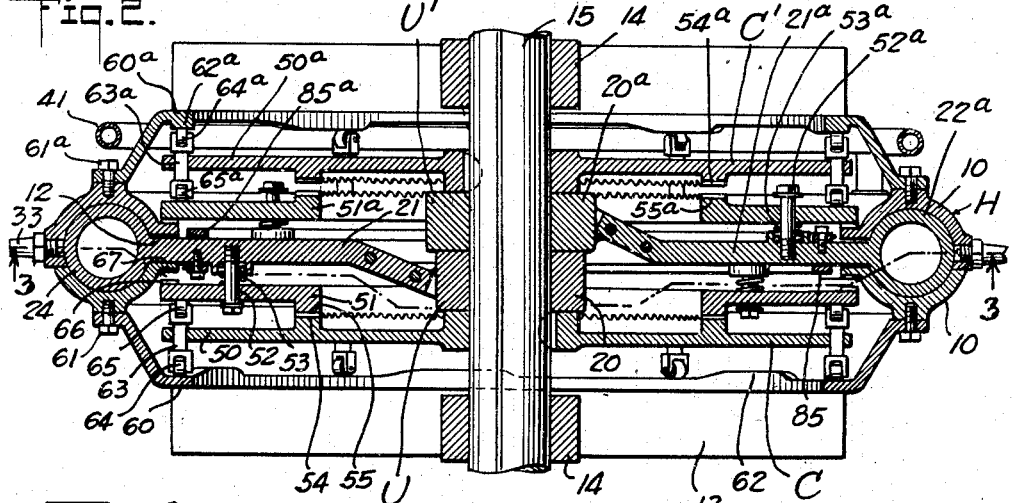
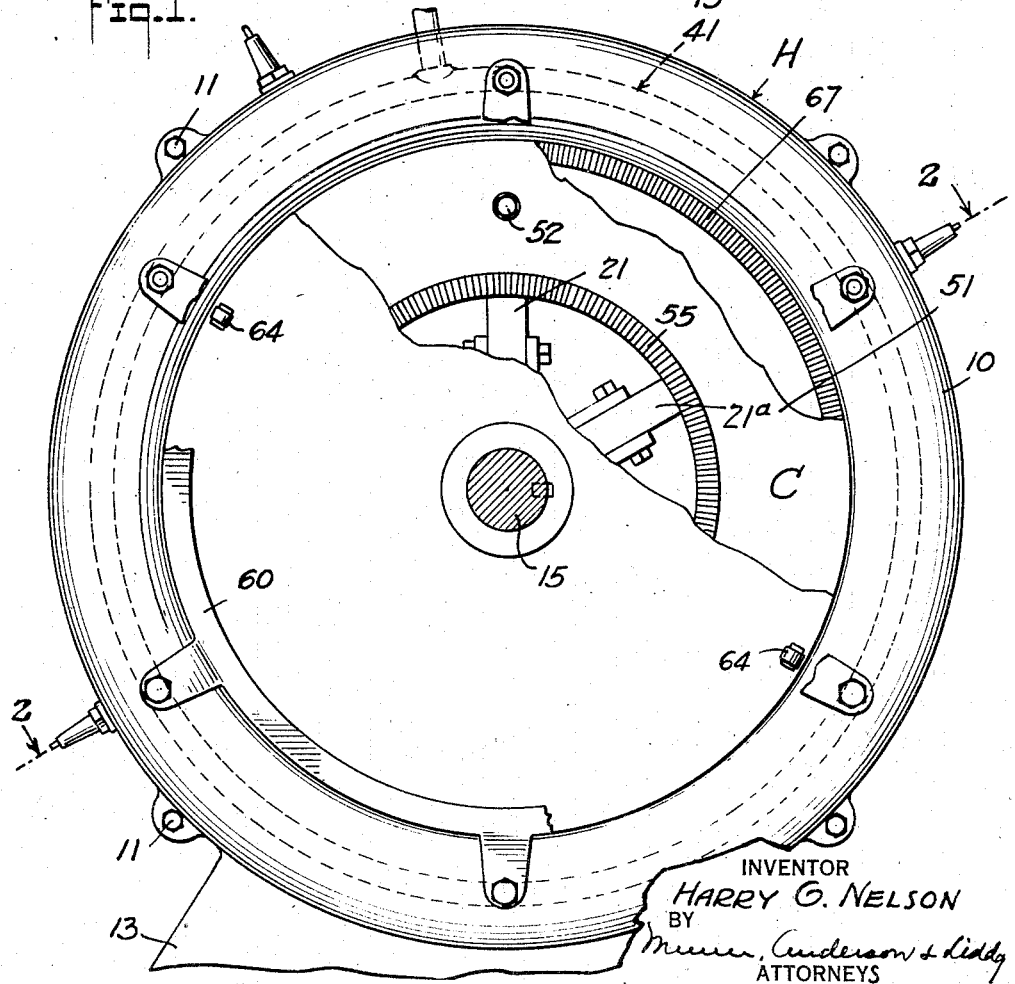
INVENTOR
HARRY G. NELSON
BY
Munn, Anderson & Liddy
ATTORNEYS April 28, 1942.  H. G. NELSON  2,280,967
ROTARY ENGINE
Filed Oct. 21, 1940  5 Sheets-Sheet 2
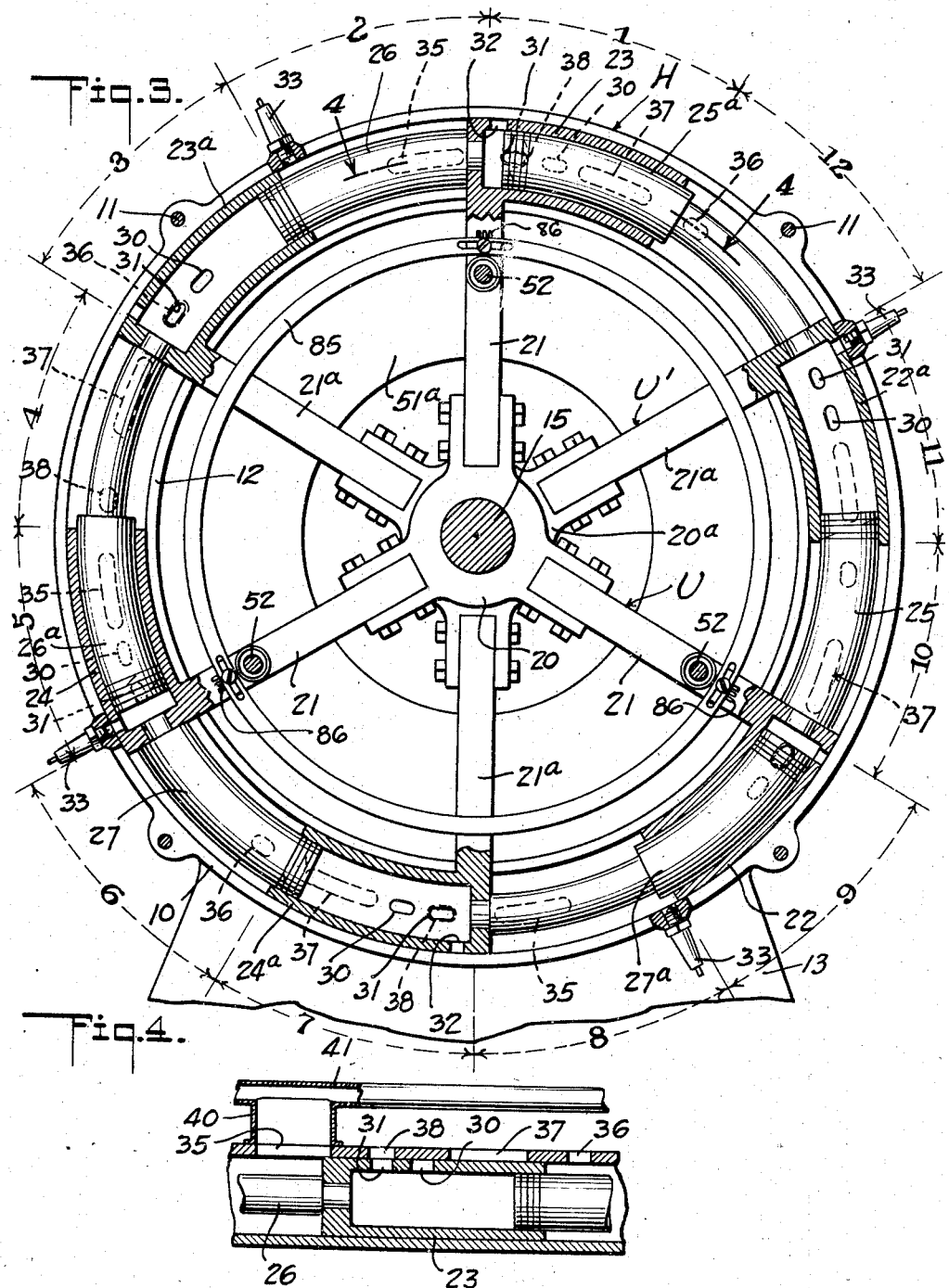
INVENTOR
HARRY G. NELSON
BY
Anderson + Liddy
ATTORNEYS April 28, 1942.    H. G. NELSON    2,280,967
ROTARY ENGINE
Filed Oct. 21, 1940    5 Sheets-Sheet 3

INVENTOR
HARRY G. NELSON
BY
Anderson & Liddy
ATTORNEYS

April 28, 1942.  H. G. NELSON  2,280,967
ROTARY ENGINE
Filed Oct. 21, 1940   5 Sheets-Sheet 5

INVENTOR
HARRY G. NELSON
ATTORNEYS

Patented Apr. 28, 1942

2,280,967

UNITED STATES PATENT OFFICE 2,280,967

ROTARY ENGINE

Harry G. Nelson, Lompoc, Calif.

Application October 21, 1940, Serial No. 362,008

4 Claims. (Cl. 123—11)

The invention relates generally to prime movers and more particularly to rotary engines.

An object of the invention is to provide an engine of the rotary type which is structurally characterized in a manner to eliminate many moving parts essential to the functioning of reciprocating types of engines, so as to produce an engine of simplified construction.

It is another object of the invention to provide an engine of the rotary type embodying correlated cylinders and pistons revolubly mounted about a common axis and co-acting in a manner to impart uni-directional movement to the engine shaft, whereby to obtain a smooth vibrationless flow of power by the elimination of all reciprocable motion.

It is a further object of the invention to provide an engine of the above described character in which a plurality of revolubly mounted piston and cylinder units are operatively interrelated and co-act with suitable clutch mechanism to alternately advance in a manner to impart a progressive rotational movement to the engine shaft.

With these and other objects in view, the invention resides in the combinations and arrangements of elements as set forth in the following specification and particularly pointed out in the appended claims.

In the accompanying drawings,

Figure 1 is a view of the rotary engine embodying this invention, in side elevation, partly broken away;

Figure 2 is an axial sectional view taken on the line 2—2 of Figure 1;

Figure 3 is a transverse sectional view taken on the line 3—3 of Figure 2;

Figure 4 is a fragmentary sectional view taken on the line 4—4 of Figure 3;

Figure 5:
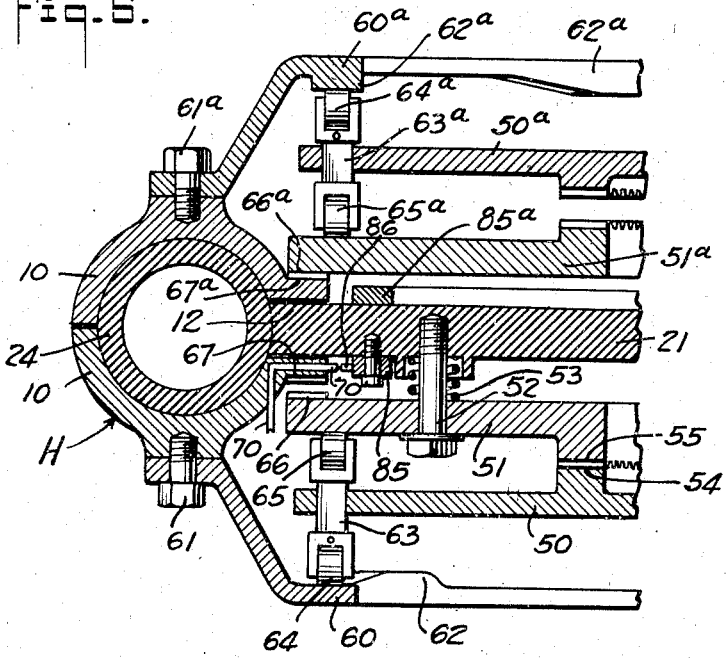
Figure 5 is an enlarged fragmentary sectional view illustrating clutch mechanisms embodied in the invention.
Figure 6:
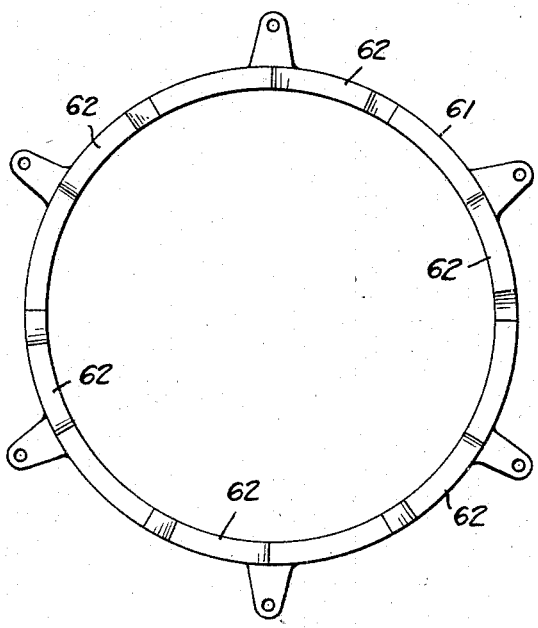
Figure 6 is a view in side elevation of one of two cam members embodied in the invention.
Figure 7:
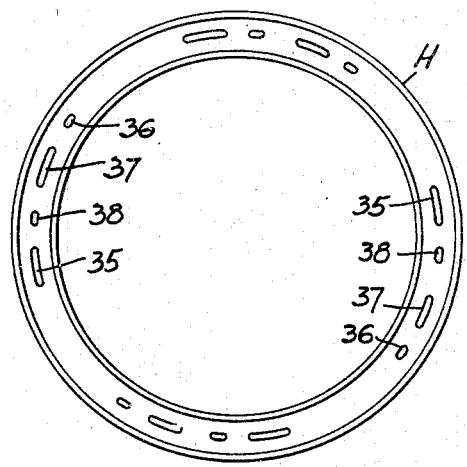
Figure 7 is a schematic view illustrating the arrangement of ports in the housing of the engine.

Referring specifically to the drawings and particularly to Figures 1 to 8, inclusive, the invention comprises an annular housing H which is circular in cross section and is composed of two semi-circular sections 10 secured together by bolts 11 to provide a sealed joint at the peripheral portion of the housing and a continuous slot 12 at the internal diameter of the housing. The sections 10 are supported by a suitable base 13 which also supports alined bearings 14 in which is journaled a driven element in the form of a shaft 15 with respect to which the housing is concentrically related.

Piston and cylinder units U and U' are operatively associated with the housing H and with the shaft 15 and are identical in construction so that a detailed description of one unit will suffice for both.

However, to distinguish similar parts of the units from each other, the numerals designating the parts of one unit are provided with exponents.

Each unit comprises a hub 20 rotatably mounted on the shaft 15 and having a plurality of equally spaced radial arms 21, of which three are illustrated in the present instance. The arms rigidly support longitudinally arcuate cylinders 22, 23 and 24 which are circular in cross section so as to have a working fit in the bore of the housing H, and from the head ends of the cylinders project pistons 25, 26 and 27.

The pistons 25, 26 and 27 are also longitudinally arcuate and circular in cross section, and it will be noted that the hubs 20 and 20a of the units U and U' are arranged side by side on the shaft 15, and that the arrangement of pistons and cylinders of the units disposes the pistons of each unit in working relationship in the cylinders of the other unit, as clearly shown in Figure 3.

Therefore, the engine illustrated is provided with six cylinders, and it will be understood that the engine is of the four stroke cycle type insofar as the operations of intake, compression, power and exhaust are concerned. In addition to these four operations, there are two air cooling operations, so that the engine is actually a six stroke cycle type.

Each of the cylinders 22, 23, 24, 22a, 23a and 24a is provided with a laterally disposed intake port 30 and a laterally disposed exhaust port 31 located nearest the head end of the cylinder with the exhaust port closest thereto as shown in Figure 3. Each cylinder is also provided with a spark passage 32 located peripherally of the cylinder close to the head end thereof, which, at predetermined times during the cycle of operation is adapted to place the sparking ends of spark plugs 33 in communication with the respective cylinders. These spark plugs, of which there are four, are supported at the ninety degree intervals in the housing H as shown in Figure 3, and are included in an ignition circuit to be later described.

The housing H is also provided with four sets of ports, each set being composed of a fuel intake port 35, a gas exhaust port 36, a cooling air intake port 37 and a cooling air exhaust port 38. These housing ports are arranged as shown in broken lines in Figure 3 and diagrammatically in Figure 7, for co-action with the ports 30 and 31 of the several cylinders in performing the six stroke cycle of operation. The four fuel intake ports 35 are connected by pipes 40 to an intake manifold 41 (Figures 1 and 4), whereas the remaining housing ports are illustrated as opening directly to the atmosphere, although a suitable exhaust manifold (not shown) for the exhaust ports 36 may be provided in practice.

Clutch and ignition timing mechanisms designated generally at C and C' are provided for the units U and U', respectively, the mechanisms being identical in construction so that a description of one will suffice for both, the numerals designating the parts of one mechanism being provided with exponents to distinguish them from similar parts of the other mechanism.

The mechanism C comprises an axially stationary clutch member 50 and an axially movable clutch member 51, the fixed member being keyed to the shaft 15 at the outer side of the hub 20. The movable clutch member 51 is mounted for movement axially of the shaft 15 on headed studs 52 projecting from the arms 21 and is urged by springs 53 towards the member 50 to bring their clutch teeth 54 and 55 into clutching engagement with each other as shown in Figure 2, to transmit rotary movement of the unit U to the shaft 15.

A cam member 60 in the form of an annulus is fixed to the housing H by bolts 61 and is provided with a series of side cams 62 arranged at equally spaced intervals of sixty degrees on the annular track of the member. At sixty degree intervals non-circular clutch actuating shafts 63 are slidably mounted in the member 51 for movement axially thereof. The ends of the shaft are provided with rotatably mounted rollers 64 and 65. The rollers 64 roll on the track of the cam member 60 for co-action with its cams 62, whereas the rollers 65 roll on the member 51 and move the latter axially against the springs 53 in response to co-action of the rollers 64 with the cams 62, whereby to move an annular series of clutch teeth 66 of the clutch member 51 into clutching engagement with a similar series of clutch teeth 67 on the housing H, so as to lock the clutch member 51 and hence the piston and cylinder unit U to the housing against rotational movement.

Figure 8:
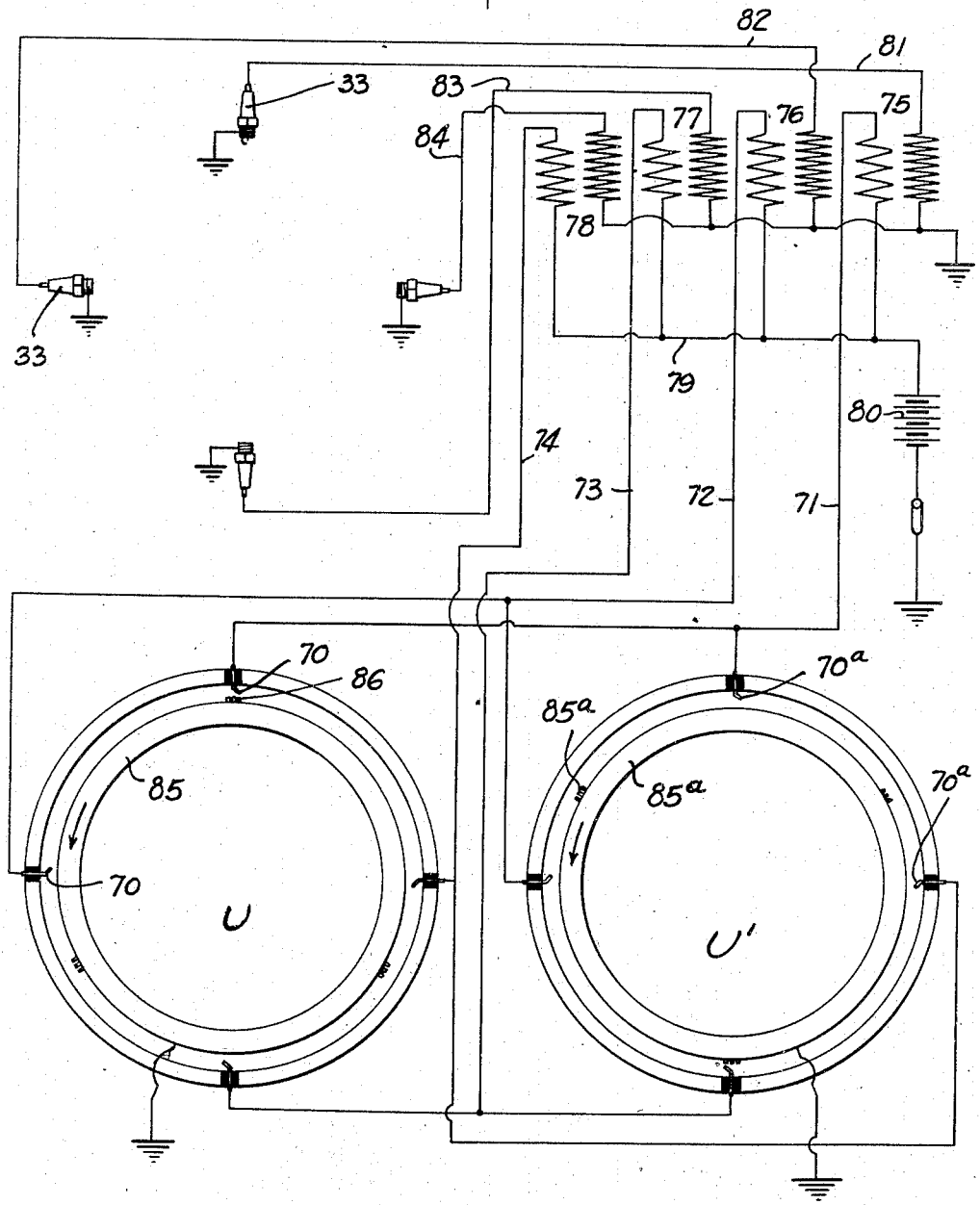
Figure 8 is a diagrammatic view of the ignition circuit of the engine.

Fixed to the housing H and suitably insulated therefrom are stationary contacts 70 which are equally spaced circumferentially and are four in number as shown diagrammatically in Figure 8. These contacts are connected by conductors 71, 72, 73 and 74 to the primary windings of spark coils 75, 76, 77 and 78, respectively, connected by a common return conductor 79 to one side of a battery 80, the other side of which is grounded. The secondary windings of the spark coils are connected by conductors 81, 82, 83 and 84 to the spark plugs 33 and are grounded as are the plugs.

Fixed to and oscillatively adjustable on the arms 21 of the unit U for rotation therewith is a grounded ring 85 carrying three equally spaced contacts 86 (Figure 8) adapted to co-act with the stationary contacts 70 creating sparks at the plugs 33 in the proper sequence during operation of the engine, which is as follows:

With the positions of the parts shown in the drawings, the unit U' is locked against rotation by the clutch mechanism C' to the stationary housing H, whereas the unit U is free to rotate and connected by the clutch C to the shaft 15.

Let it be assumed that a compressed charge of gaseous fuel in the cylinder 24 has been ignited by a plug 33. As the piston 26a which works in the cylinder 24 is part of the unit U' and is, therefore, locked against rotation by the clutch mechanism C', the force of the ignited fuel charge will react upon the cylinder 24 to advance the unit U in a counterclockwise direction as viewed in Figure 3. During this movement, which extends through an angle of thirty degrees, piston 27 is forcing cooling air from the cylinder 24a through the registering ports 31 and 38, cooling air is being drawn into the cylinder 22 through the housing port 37 of the respective set, piston 25 is compressing a charge of fuel in the cylinder 22a, a charge of fuel is being drawn into the cylinder 23 through the housing port 35 of the respective set, and the piston 26 is forcing burnt gas from the cylinder 23a through the registering ports 31 and 38.

As the unit U is operatively connected to the shaft 15 through the clutch mechanism C, the shaft will be correspondingly rotated by the unit U, it being clear from Figure 2 that as the clutch teeth 54 and 55 of the clutch members 50 and 51 are engaged, the member 51 will be driven by the unit U to transmit its motion to the shaft 15 through the keyed connection therewith.

As the compression in the cylinder 22a overcomes the force of the power stroke at the end of the aforestated thirty degrees movement of the unit U, the movement ceases, at which time the cams 62 of the cam member 60 co-act with the rollers 64 and 65 to actuate the clutch mechanism C so as to lock the unit U to the housing H. Concurrently with this operation the cams 62a of the cam member 60a release the rollers 64a so that the springs 53a of the clutch mechanism C' actuate the latter to unlock the unit U' from the housing H by disengaging the clutch teeth 66a and 67a, and to lock the unit U' to the shaft 15 by urging the teeth 54a and 55a of the clutch members 50a and 51a into engagement.

The compressed charge of fuel in the cylinder 22a will now be ignited to advance the unit U' in a counterclockwise direction through a second angle of thirty degrees, during which movement a charge of fuel is being compressed by the piston 25a in the cylinder 23, cooling air is being drawn into the cylinder 23a; burnt gas is being exhausted from the cylinder 24 by the piston 26a; a charge of fuel is being drawn into the cylinder 24a, and cooling air is being exhausted from the cylinder 22 by the piston 27a.

This stroke cycle of operation is repeated by each unit alternating to progressively advance the shaft 15 as a result of power impulses created in all cylinders in successive order, the cylinders being air cooled during idle periods in the cycle. Any suitable oiling system (not shown) may be provided to lubricate the bore of the housing H and aid in cooling the working parts; or liquid cooling can be provided if desired.

The sequence of operation of the pistons and co-acting cylinders of the units U and U' is in accordance with the following timing chart, it being understood that there are twenty-four power impulses in one revolution of the shaft 15, divided equally between the two units, with the latter functioning alternately. The advancing movements of the units are indicated by the angular divisions numbered from 1 to 12, inclusive, in Figure 3.

In the chart.

I=fuel intake stroke;
C=fuel compression stroke;
P=power stroke;
E=burnt gas exhaust stroke;
K¹=cooling air intake stroke;
Kᵉ=cooling air exhaust stroke.

1, 2, 3, 4, 5, 6, 7, 8, 9, 10, 11, 12 correspond to identically numbered divisions in Figure 3 during which the various operations listed in the chart, take place.

cylinders of the other unit; fuel supply means for the cylinders; means for igniting fuel charges in the cylinders; means for holding one unit against rotation and operatively connecting the other unit to said element alternately; the housing and cylinders having fuel intake and exhaust ports co-acting to enable fuel to be inducted, compressed, ignited and exhausted in such order in the cylinders of the units that the units will co-act with the last said means in imparting progressive rotational movement to said element, the housing having other ports co-act-

TIMING CHART

Unit U

| | | | | | | | | | | | | |
|---|---|---|---|---|---|---|---|---|---|---|---|---|
| Cylinder 22 | K¹—9 | I—10 | P—11 | K¹—12 | I—1 | P—2 | K¹—3 | I—4 | P—5 | K¹—6 | I—7 | P—8 |
| Piston 25 | C—10 | E—11 | Kᵉ—12 | C—1 | E—2 | Kᵉ—3 | C—4 | E—5 | Kᵉ—6 | C—7 | E—8 | Kᵉ—4 |
| Cylinder 23 | I—1 | P—2 | K¹—3 | I—4 | P—5 | K¹—6 | I—7 | P—8 | K¹—9 | I—10 | P—11 | K¹—12 |
| Piston 26 | E—2 | Kᵉ—3 | C—4 | E—5 | Kᵉ—6 | C—7 | E—8 | Kᵉ—9 | C—10 | E—11 | Kᵉ—12 | C—1 |
| Cylinder 24 | P—5 | K¹—6 | I—7 | P—8 | K¹—9 | I—10 | P—11 | K¹—12 | I—1 | P—2 | K¹—3 | I—4 |
| Piston 27 | Kᵉ—6 | C—7 | E—8 | Kᵉ—9 | C—10 | E—11 | Kᵉ—12 | C—1 | E—2 | Kᵉ—3 | C—4 | E—5 |

Unit U'

| | | | | | | | | | | | | |
|---|---|---|---|---|---|---|---|---|---|---|---|---|
| Cylinder 23ᵃ | K¹—3 | I—4 | P—5 | K¹—6 | I—7 | P—8 | K¹—9 | I—10 | P—11 | K¹—12 | I—1 | P—2 |
| Piston 26ᵃ | E—5 | Kᵉ—6 | C—7 | E—8 | Kᵉ—9 | C—10 | E—11 | Kᵉ—12 | C—1 | E—2 | Kᵉ—3 | C—4 |
| Cylinder 24ᵃ | I—7 | P—8 | K¹—9 | I—10 | P—11 | K¹—12 | I—1 | P—2 | K¹—3 | I—4 | P—5 | K¹—6 |
| Piston 27ᵃ | Kᵉ—9 | C—10 | E—11 | Kᵉ—12 | C—1 | E—2 | Kᵉ—3 | C—4 | E—5 | Kᵉ—6 | C—7 | E—8 |
| Cylinder 22ᵃ | P—11 | K¹—12 | I—1 | P—2 | K¹—3 | I—4 | P—5 | K¹—6 | I—7 | P—8 | K¹—9 | I—10 |
| Piston 25ᵃ | C—1 | E—2 | Kᵉ—3 | C—4 | E—5 | Kᵉ—6 | C—7 | E—8 | Kᵉ—9 | C—10 | E—11 | Kᵉ—12 |

Figure 9:
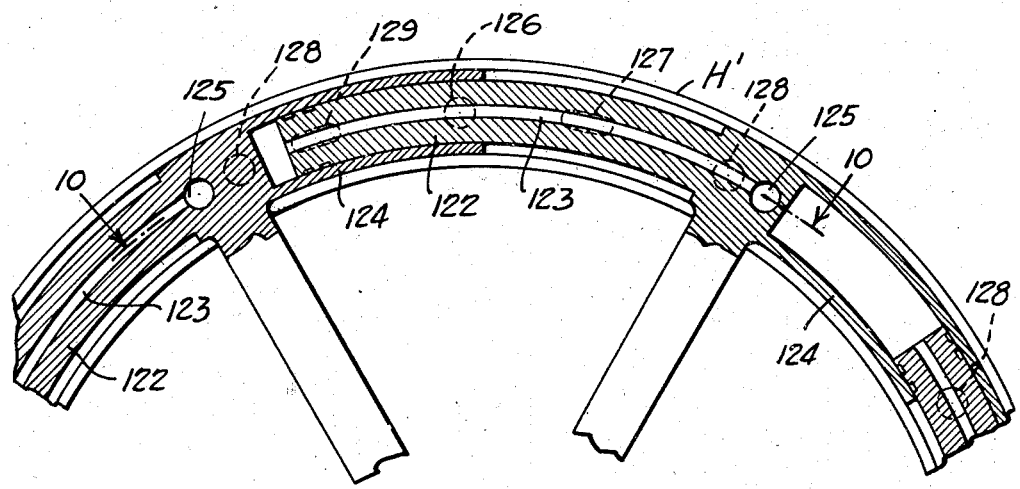
Figure 9 is a fragmentary transverse sectional view illustrating a modified arrangement of housing and cylinder ports.
Figure 10:
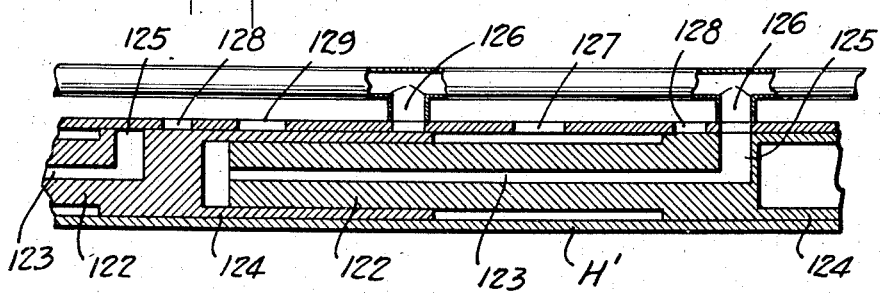
Figure 10 is a sectional view taken on the line 10—10 of Figure 9.

Reference will now be had to Figures 9 and 10, which illustrate a modified arrangement of ports for fuel and cooling air. In this instance, the pistons 122 are provided with axial passages 123 opening at their head ends into the cylinders 124 in which they work, and at their other ends into lateral ports 125 in the heads of the cylinders to register in proper sequence with fuel intake ports 126, burnt gas exhaust ports 127, cooling air intake ports 128 and cooling air exhaust ports 129, all of which are arranged in four sets in the housing for co-action with the cylinder ports in performing the six stroke cycle of operation previously described.

What is claimed is:

1. An engine of the class described comprising: an element mounted for rotation about a fixed axis; a stationary housing having an annular bore concentric to said axis; a plurality of piston and cylinder units mounted for rotation independently of each other about said axis with the cylinders having a working fit in said bore, and the pistons of each unit working in the cylinders of the outer unit; fuel supply means for the cylinders; means for igniting fuel charges in the cylinders; means for holding one unit against rotation and operatively connecting the other unit to said element alternately; means whereby fuel will be inducted, compressed, ignited and exhausted by co-action of the pistons and cylinders in synchronism with the operation of the last means so as to impart a step by step progressive rotational movement to said element by power impulses delivered alternately by the units; and means through which cooling air will be inducted into and exhausted from the cylinders by co-action of the cylinders and pistons during the cycle of operation, so as to dissipate heat from the cylinders.

2. An engine of the class described comprising: an element mounted for rotation about a fixed axis; a stationary housing having an annular bore concentric to said axis; a plurality of piston and cylinder units mounted for rotation independently of each other about said axis with the cylinders having a working fit in said bore, and the pistons of each unit working in the able with the ports of the cylinders to supply cooling air thereto and exhaust the air therefrom during the cycle of operation, so as to dissipate heat from the cylinders.

3. An engine of the class described comprising: a rotatably mounted shaft; a stationary housing having an annular bore concentric to the axis of said shaft; a plurality of power units independently mounted for rotation about said axis and each composed of longitudinally arcuate pistons and cylinders connected in end to end relation with the cylinders having a working fit in said bore and the pistons of each unit working in the cylinders of the other unit; the housing and cylinders having ports through which fuel is inducted into, compressed, ignited and exhausted from the cylinders of the units in such timed relationship to the operation of the first means that the units will alternately operate to deliver torque to said shaft unidirectionally, the housing having other ports through which cooling air is supplied to and exhausted from the cylinders during the cycle of operation so as to dissipate heat from the cylinders.

4. An engine of the class described comprising: an element mounted for rotation about a fixed axis; a plurality of units having longitudinally arcuate pistons and cylinders and mounted for rotation independently of each other about said axis, with the pistons of each unit working in the cylinders of the other unit; fuel supply means for the cylinders; means for igniting fuel charges in the cylinders; means for holding one unit against rotation and operatively connecting the other unit to said element alternately; means by which fuel will be inducted, compressed, ignited and exhausted by co-action of the pistons and cylinders in synchronism with the last means so as to impart a step by step progressive rotational movement to said element by power impulses delivered alternately by the units; and means through which cooling air will be inducted into and exhausted from the cylinders by co-action of the cylinders and pistons during the cycle of operation, so as to dissipate heat from the cylinders.

HARRY G. NELSON.